(12) United States Patent
Chin

(10) Patent No.: US 7,869,205 B2
(45) Date of Patent: Jan. 11, 2011

(54) DATA PROCESSING DEVICE

(75) Inventor: Te-Sen Chin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 249 days.

(21) Appl. No.: 12/272,814

(22) Filed: Nov. 18, 2008

(65) Prior Publication Data
US 2010/0067183 A1 Mar. 18, 2010

(30) Foreign Application Priority Data
Sep. 12, 2008 (TW) ............... 97135250 A

(51) Int. Cl.
*G06F 1/16* (2006.01)
(52) U.S. Cl. .............. 361/679.34; 361/679.26; 361/679.27; 361/679.33; 360/97.01
(58) Field of Classification Search ............ 361/679.33, 361/679.34
See application file for complete search history.

(56) References Cited
U.S. PATENT DOCUMENTS
6,480,375 B2 * 11/2002 Horikoshi et al. ...... 361/679.34
6,735,043 B2 * 5/2004 Bernett et al. ............ 360/97.01
2006/0285288 A1 * 12/2006 Yeh et al. .................... 361/685
2009/0103259 A1 * 4/2009 Nakamura ............. 361/679.33

* cited by examiner

*Primary Examiner*—Jayprakash N Gandhi
*Assistant Examiner*—Anthony Q Edwards
(74) *Attorney, Agent, or Firm*—Jianq Chyun IP Office

(57) ABSTRACT

A data processing device including a first housing, a second housing, and a bracket is provided. The bracket is disposed between the first housing and the second housing. The bracket has a body and a plurality of supporting ends. The body has a bearing surface and a supporting surface. The bearing surface faces the first housing, and does not contact the first housing. The supporting surface faces the second housing, and does not contact the second housing. The supporting ends are disposed around the body and contact the first housing to support the body. A first distance between the supporting surface relatively away from the supporting ends and the second housing is larger than a second distance between the supporting surface relatively close to the supporting ends and the second housing.

10 Claims, 7 Drawing Sheets

DATA PROCESSING DEVICE

CROSS-REFERENCE TO RELATED APPLICATION

This application claims the priority benefit of Taiwan application serial no. 97135250, filed on Sep. 12, 2008. The entirety of the above-mentioned patent application is hereby incorporated by reference herein and made a part of specification.

BACKGROUND OF THE INVENTION

1. Field of the Invention

The present invention generally relates to a data processing device, in particular, to a data processing device having an optimal design.

2. Description of Related Art

With the development of science and technology, the volume of an electronic product becomes increasingly smaller, and the space for disposing internal components becomes increasingly smaller too, such that the arrangement of a protecting structure of the components is quite limited. Under a situation that the components cannot be sufficiently protected, the electronic product is easily affected by an external force, such that the electronic product cannot operate normally, the service life is shortened, or even the electronic product is damaged.

Take a common notebook computer for example, people attach great importance to the portability of the notebook computer, so the design is limited in terms of the volume. However, as the demand of the user on the functions is increasingly higher, the available space to the components in the notebook computer is extremely limited, such that the arrangement and the protecting effect of the protecting structure for protecting the components are also affected.

For example, usually a hard disk drive, a floppy disk drive, an optical disk drive, or other devices may be disposed under a palm rest of the notebook computer. When the user uses the notebook computer and operates the device, if the user puts the hands or other objects on the palm rest, a bearing region of the palm rest may be easily depressed, which presses the device under the palm rest, and affects the operation of the device.

According to experience of many users, after the notebook computer is used for a period of time, abnormal noises often appear during the operation of the device, and the noises are usually caused by the deformation of the palm rest.

SUMMARY OF THE INVENTION

Accordingly, the present invention is directed to a data processing device having an optimal design.

The present invention provides a data processing device, which includes a first housing, a second housing, and a bracket. The bracket is disposed between the first housing and the second housing. The bracket has a body and a plurality of supporting ends. The body has a bearing surface and a supporting surface. The bearing surface faces the first housing and does not contact the first housing. The supporting surface faces the second housing and does not contact the second housing. The supporting ends are disposed around the body and contact the first housing to support the body. A first distance between the supporting surface relatively away from the supporting ends and the second housing is larger than a second distance between the supporting surface relatively close to the supporting ends and the second housing.

In the data processing device according to an embodiment of the present invention, a material of the first housing is plastic.

In the data processing device according to an embodiment of the present invention, a material of the second housing is plastic or metal.

In the data processing device according to an embodiment of the present invention, a material of the bracket is plastic or metal.

In the data processing device according to an embodiment of the present invention, the supporting surface is an arch surface or has a shallow dish shape.

In the data processing device according to an embodiment of the present invention, the first housing has a plurality of bosses, and the bosses are disposed corresponding to the supporting ends.

In the data processing device according to an embodiment of the present invention, the data processing device further includes a keyboard module disposed between the bracket and the second housing.

In the data processing device according to an embodiment of the present invention, the data processing device further includes a plurality of keys protruding out of the first housing.

In the data processing device according to an embodiment of the present invention, the data processing device further includes an optical disk drive disposed between the bracket and the second housing.

In the data processing device according to an embodiment of the present invention, the data processing device further includes a display pivoted to a main body composed of the first housing and the second housing.

In the data processing device of the present invention, the supporting ends of the bracket are connected to the first housing, such that the body of the bracket does not contact the first housing, and the first distance between the supporting surface of the body relatively away from the supporting ends and the second housing is larger than the second distance between the supporting surface of the body relatively close to the supporting ends and the second housing, so as to prevent the body of the bracket from being depressed and deformed to contact the optical disc drive when the first housing is slightly depressed and deformed. Thus, a good supporting effect is achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
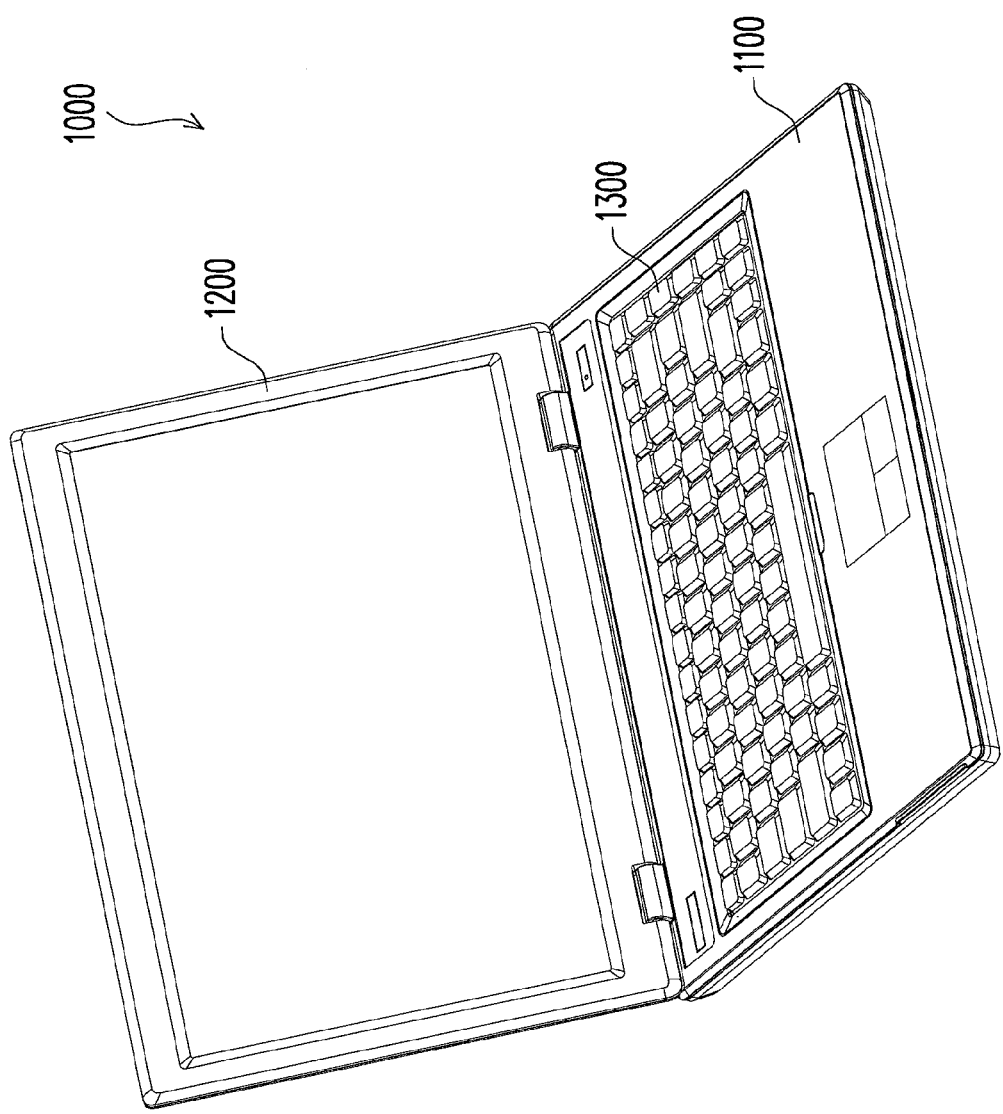
FIG. 1 is a schematic view of a data processing device of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
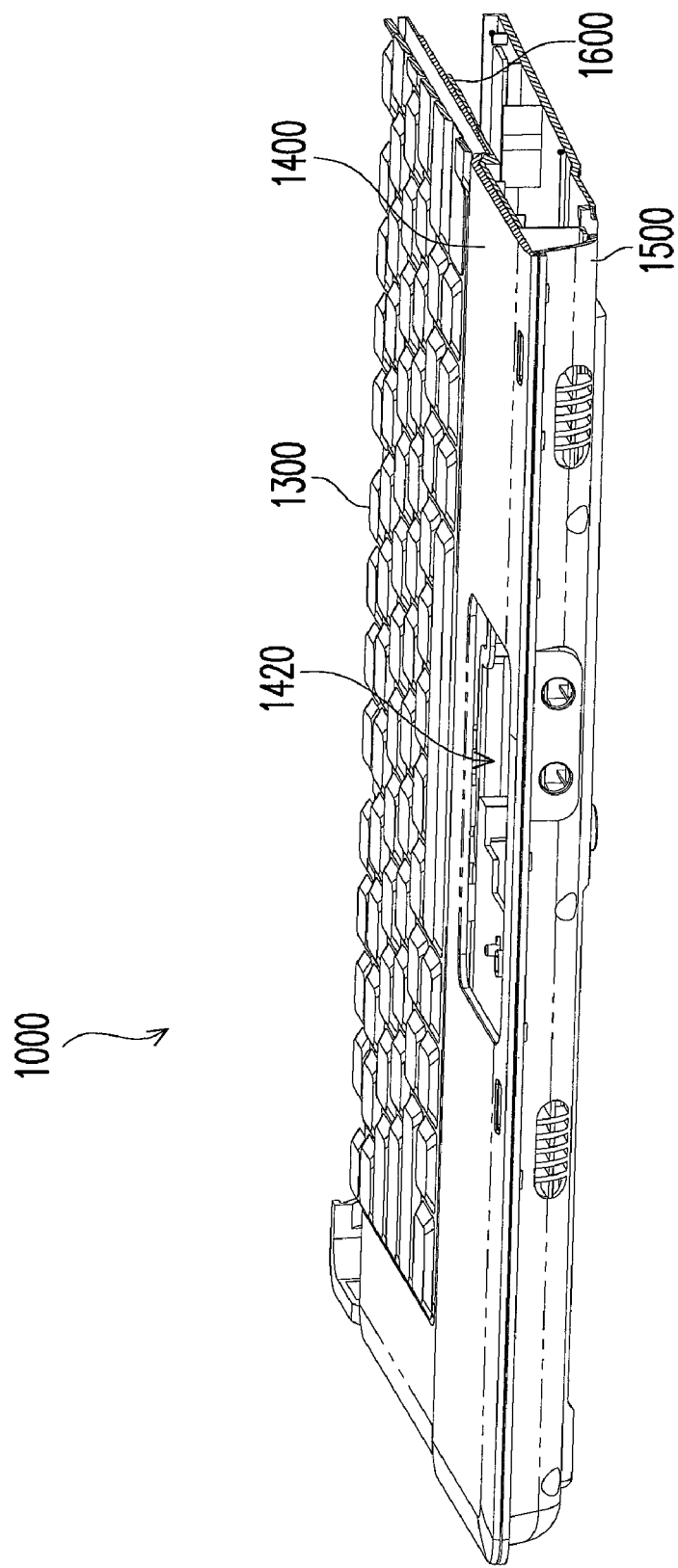
FIG. 2 is a partial schematic view of the data processing device of FIG. 1.
Figure 3:
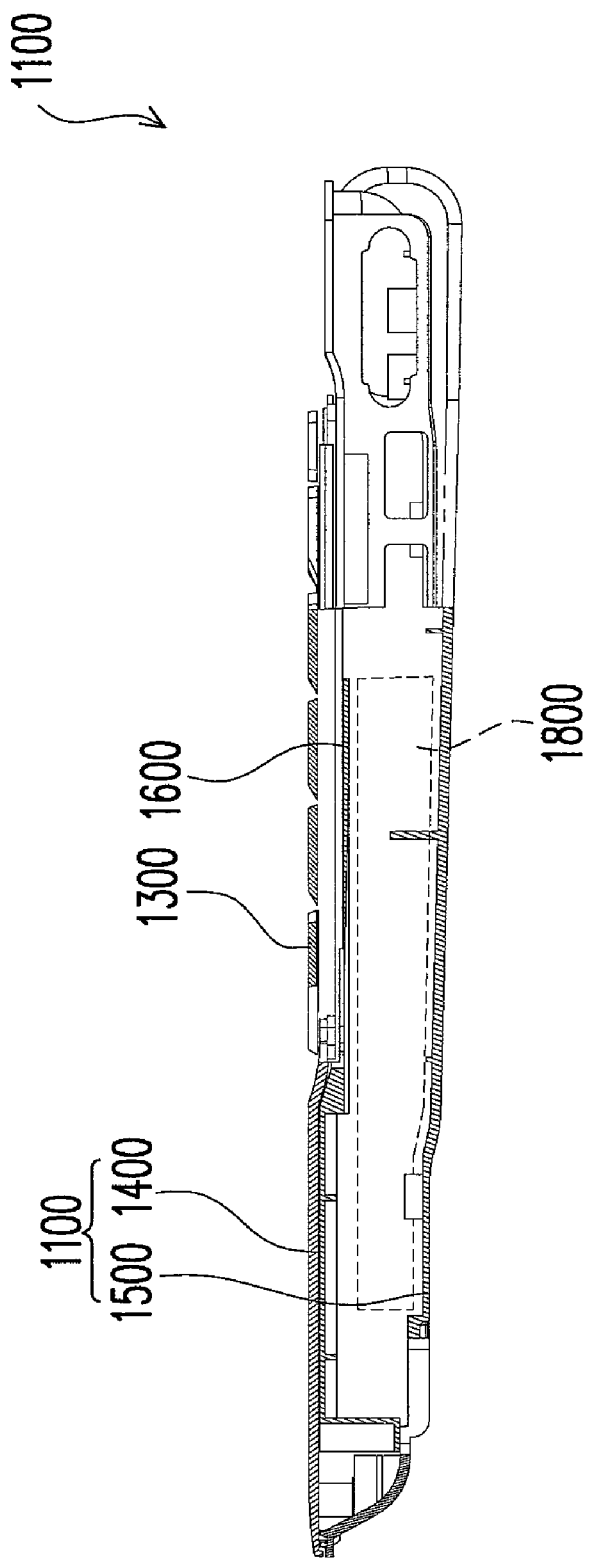
FIG. 3 is a schematic cross-sectional view of FIG. 2.

FIG. 1 is a schematic view of a data processing device of the present invention, FIG. 2 is a partial schematic view of the data processing device of FIG. 1, and FIG. 3 is a schematic cross-sectional view of FIG. 2. Referring to FIGS. 1, 2, and 3, a data processing device 1000 of this embodiment is a notebook computer, which includes a main body 1100 and a display 1200. The display 1200 is pivoted to the main body 1100, a plurality of keys 1300 is disposed on the main body 1100, and the keys 1300 face the display 1200.

Figure 4:
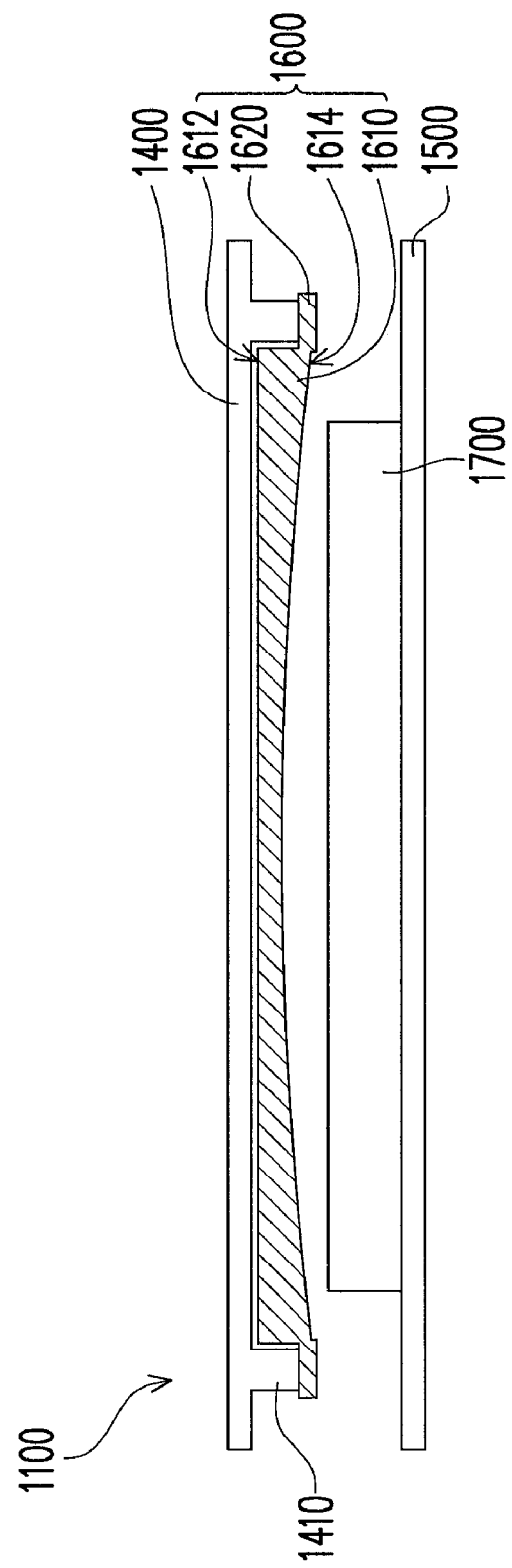
FIG. 4 is a schematic cross-sectional view of the data processing device of FIG. 1.
Figure 5:
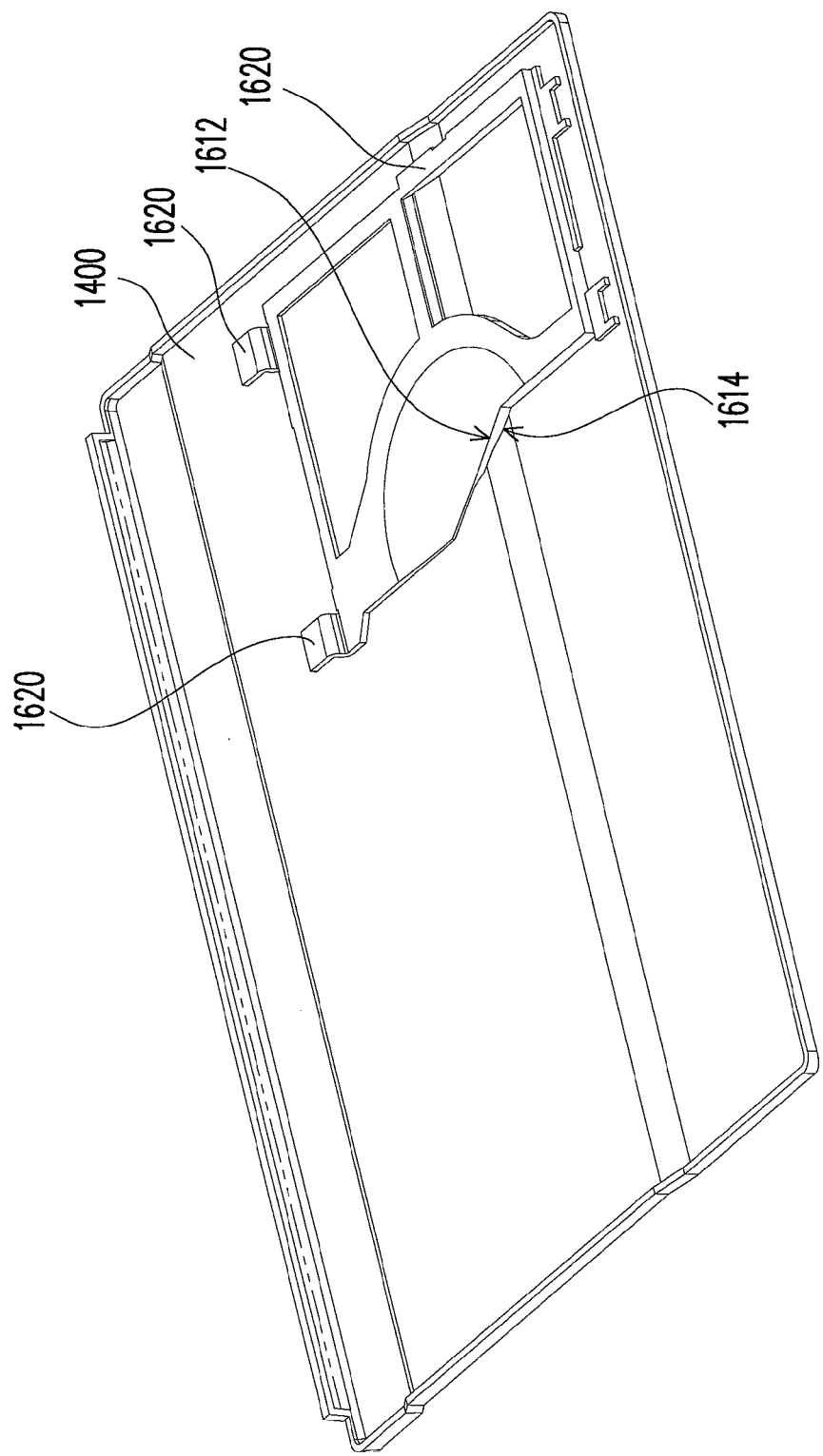
FIG. 5 is a schematic view of a first housing and a bracket of the data processing device of FIG. 4.

FIG. 4 is a schematic cross-sectional view of the data processing device of FIG. 1, and FIG. 5 is a schematic view of a first housing and a bracket of the data processing device of FIG. 4. It should be noted that FIGS. 3 and 4 are respectively schematic views of the data processing device of FIG.1 along different section lines. Referring to FIGS. 3, 4, and 5, the main body 1100 of the data processing device 1000 (as shown in FIG. 1) is composed of a first housing 1400 and a second housing 1500, and a bracket 1600 is disposed between the first housing 1400 and the second housing 1500. The bracket 1600 includes a body 1610 and a plurality of supporting ends 1620, and the supporting ends 1620 are disposed around the body 1610 and contact the first housing 1400 to support the body 1610. In detail, a plurality of bosses 1410 corresponding to the plurality of supporting ends 1620 of the bracket 1600 is disposed on a surface of the first housing 1400 facing the second housing 1500, and the supporting ends 1620 are connected to the bosses 1410. In addition, the body 1610 of the bracket 1600 has a bearing surface 1612 and a supporting surface 1614, in which the bearing surface 1612 faces the first housing 1400 and does not contact the first housing 1400. In other words, a first distance exists between the bearing surface 1612 and the first housing 1400. The supporting surface 1614 faces the second housing 1500 and does not contact the second housing 1500. That is, a second distance exists between the supporting surface 1614 and the second housing 1500. It should be noted that the distance between the supporting surface 1614 and the second housing 1500 varies when the supporting surface 1614 is relatively away from the supporting ends 1620 or is relatively close to the supporting ends 1620. In detail, the first distance between the supporting surface 1614 relatively away from the supporting ends 1620 and the second housing 1500 is larger than the second distance between the supporting surface 1614 relatively close to the supporting ends 1620 and the second housing 1500.

Figure 6:
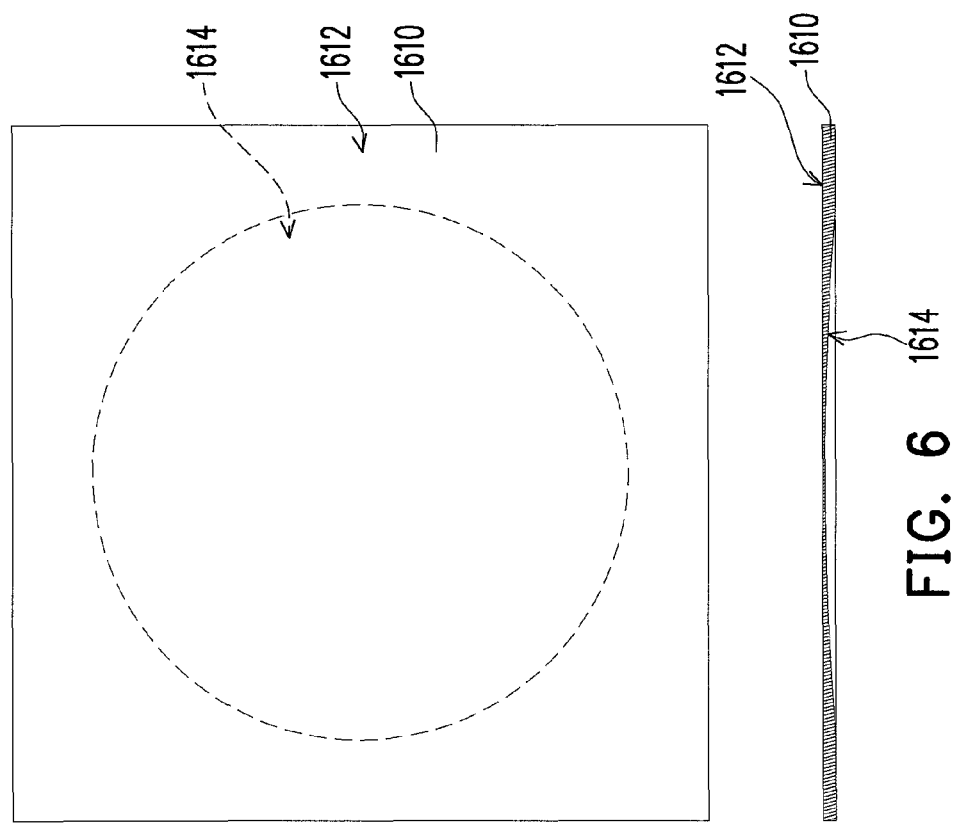
FIG. 6 is a schematic view and a cross-sectional view of a body of the bracket of FIG. 4.

In this embodiment, a material of the first housing 1400 and the second housing 1500 may be plastic, in addition, the material of the second housing 1500 may also be metal, and a material of the bracket 1600 may be plastic or metal. The bracket 1600 made of plastic may be integrally formed with the first housing 1400, so as to save the assembly time, but the bracket 1600 made of metal may provide a better supporting effect than that the bracket 1600 made of plastic because of the rigidity of the metal. FIG. 6 is a schematic view and a cross-sectional view of the body of the bracket of FIG. 4. Referring to FIGS. 4 and 6, an upper part of FIG. 6 is the schematic view of the body, and a lower part of FIG. 6 is the cross-sectional view of the body. The supporting surface 1614 may be an arch surface, and the body 1610 of the bracket 1600 (as shown in FIG. 4) of FIG. 6 has a complete shape, so as to provide a good supporting effect. It should be noted that the shape of the body 1610 may also have an incomplete shape, as shown in FIG. 5, so as to save the space in the data processing device 1000 (as shown in FIG. 1) to dispose other extension devices or elements. Thus, the functionality of the data processing device 1000 is improved.

As described above, the data processing device 1000 further includes a keyboard module 1700 disposed between the bracket 1600 and the second housing 1500, as shown in FIG. 4. In addition, the data processing device 1000 further includes an optical disk drive 1800 disposed between the bracket 1600 and the second housing 1500, as shown in FIG. 3, in which the optical disk drive 1800 is, for example, inserted from a side of the data processing device 1000 into the main body 1100, and the optical disk drive 1800 is located beside the keyboard module 1700. Further, the keys 1300 of the data processing device 1000 protrude out of the first housing 1400, and are disposed corresponding to the keyboard module 1700.

Referring to FIG. 2, a touchpad arrangement opening 1420 is disposed on an edge of the first housing 1400, and a touchpad may be arranged in the touchpad arrangement opening 1420. The touchpad may provide a cursor function, which is similar to the function of a mouse of a desktop computer. A palm rest is located on two sides of the touchpad arrangement opening 1420, and when the user presses the keys 1300, the hands may be placed on the palm rest.

Next, referring to FIGS. 1, 2, and 4, when the user puts the hands or a heavy object on the palm rest of the data processing device 1000 of this embodiment, the first housing 1400 may be depressed. However, as a first distance exists between the first housing 1400 and the bearing surface 1612 of the body 1610 of the bracket 1600, the first distance may provide a cushioning effect to avoid the first housing 1400 from pressing the bracket 1600. When the force applied on the first housing 1400 is too large, the first housing 1400 may be deformed and press the body 1610 of the bracket 1600. At this time, the bracket 1600 may provide the supporting force to prevent the first housing 1400 from pressing the optical disk drive 1700 under the bracket 1600. Particularly, when the body 1610 of the bracket 1600 is deformed by the force which is too large, as the supporting surface 1614 is, for example, an arch surface, the first distance between the supporting surface 1614 relatively away from the supporting ends 1620 and the optical disk drive 1800 (as shown in FIG. 3) is relatively larger, so as to prevent the body 1610 of the bracket 1600 from directly contacting the optical disk drive 1800, such that the operation of the optical disk drive 1800 is not affected. In addition, the supporting surface 1614 is fabricated as the arch surface, so as to shorten the second distance between the supporting surface 1614 relatively close to the supporting ends 1620 and the second housing 1500 as compared with the conventional art. Thus, the thickness of the main body 1100 is reduced more effectively, and the entire volume and weight of the data processing device 1000 is reduced.

Figure 7:
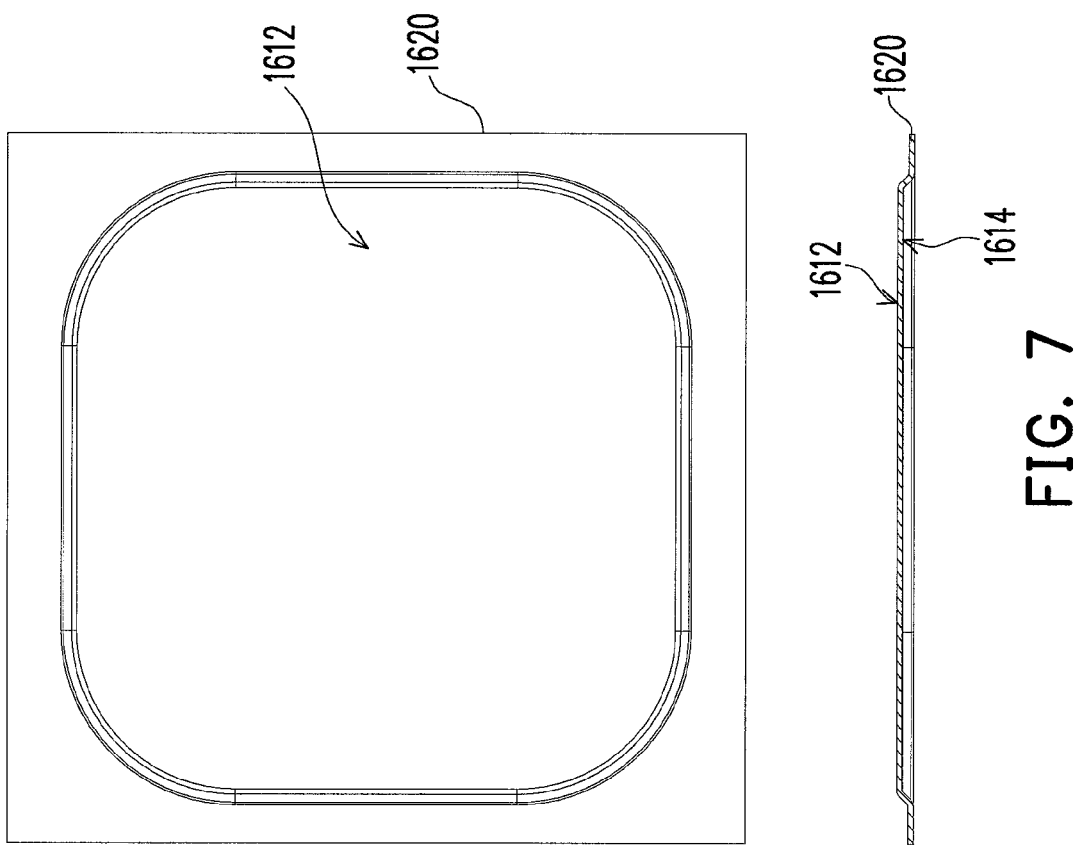
FIG. 7 is a schematic view and a cross-sectional view of another implementing aspect of a supporting surface.

FIG. 7 is a schematic view and a cross-sectional view of another implementing aspect of a supporting surface. In another embodiment, the supporting surface 1614 may also have a shallow dish shape. An upper part of FIG. 7 is the schematic view of the body having the shallow dish shape, and a lower part of FIG. 7 is the cross-sectional view of the body. It is known that in the present invention, the shape of the supporting surface 1614 is not limited, and as long as the first distance between the supporting surface 1614 relatively away from the supporting ends 1620 and the second housing 1500 is larger than the second distance between the supporting surface 1614 relatively close to the supporting ends 1620 and the second housing 1500, the spirit of the present invention is realized.

It should be noted that the supporting ends 1620 are connected to the first housing 1400, so it is easy for the assembly personnel to perform the assembly. In addition, the supporting ends 1620 are assembled to the first housing 1400, such that the body 1610 is deformed with the first housing 1400 to a better protecting function.

To sum up, in the data processing device of the present invention, the supporting ends of the bracket are connected to the first housing, such that the body of the bracket does not contact the first housing. Thus, the body of the bracket will not be depressed and deformed to contact the optical disk drive when the first housing is slightly depressed and deformed. In addition, the first distance between the supporting surface of the body relatively away from the supporting ends and the second housing is larger than the second distance between the supporting surface of the body relatively close to the supporting ends and the second housing, so as to achieve a good supporting effect. Furthermore, the assembly personnel may easily connect the supporting ends to the first housing, so the assembly convenience is achieved. In addition, the supporting ends are assembled to the first housing, such that the body is deformed with the first housing, so as to provide the better protecting function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data processing device, comprising:
   a first housing;
   a second housing; and
   a bracket, disposed between the first housing and the second housing, and comprising:
   a body, comprising a bearing surface and a supporting surface, wherein the bearing surface faces the first housing and does not contact the first housing, and the supporting surface faces the second housing and does not contact the second housing; and
   a plurality of supporting ends, disposed around the body, and contacting the first housing to support the body, wherein a first distance between the supporting surface relatively away from the supporting ends and the second housing is larger than a second distance between the supporting surface relatively close to the supporting ends and the second housing.

2. The data processing device according to claim 1, wherein a material of the first housing is plastic.

3. The data processing device according to claim 1, wherein a material of the second housing is plastic or metal.

4. The data processing device according to claim 1, wherein a material of the bracket is plastic or metal.

5. The data processing device according to claim 1, wherein the supporting surface is an arch surface or has a shallow dish shape.

6. The data processing device according to claim 1, wherein the first housing comprises a plurality of bosses, and the bosses are disposed corresponding to the supporting ends.

7. The data processing device according to claim 1, further comprising a keyboard module disposed between the bracket and the second housing.

8. The data processing device according to claim 1, further comprising a plurality of keys protruding out of the first housing.

9. The data processing device according to claim 1, further comprising an optical disk drive disposed between the bracket and the second housing.

10. The data processing device according to claim 1, further comprising a display pivoted to a main body composed of the first housing and the second housing.

\* \* \* \* \*